Dec. 11, 1928.

D. S. DE LAVAUD 1,694,377

FREE WHEEL CLUTCH

Filed Feb. 14, 1927

Inventor:
Dimitri Sensaud de Lavaud.

Dec. 11, 1928.

D. S. DE LAVAUD

FREE WHEEL CLUTCH

Filed Feb. 14, 1927

Inventor:
Dimitri Sensaud de Lavaud

Patented Dec. 11, 1928.

1,694,377

UNITED STATES PATENT OFFICE.

DIMITRI SENSAUD DE LAVAUD, OF PARIS, FRANCE.

FREE-WHEEL CLUTCH.

Application filed February 14, 1927, Serial No. 168,164, and in France February 19, 1926.

The principal objects of this invention are to provide an extremely simple construction which will be very positive in its operation and inexpensive to manufacture and in which the clutch blocks will maintain true alignment.

The principal features of the invention consist in the novel construction of the clutch blocks arranged between two cylindrical surfaces and engaging parallel plane surfaces at the ends whereby cylindrical surfaces form the bearing surfaces between adjacent blocks.

A further feature of importance consists in the novel construction of elastically expansible members interposed at intervals between the clutch blocks.

In the drawings Figure 1 is an enlarged elevational diagram showing the construction of the clutch blocks.

Figure 2:
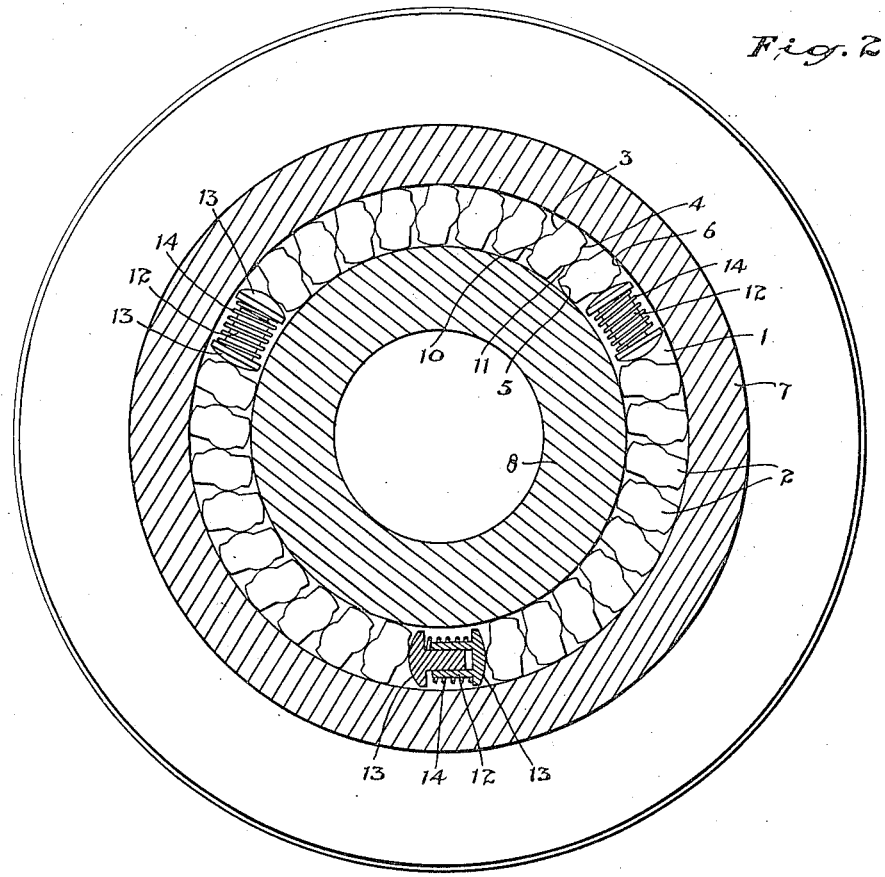
Figure 2 is a sectional elevational view of a pair of cylindrical members showing the application of the invention.
Figure 1:
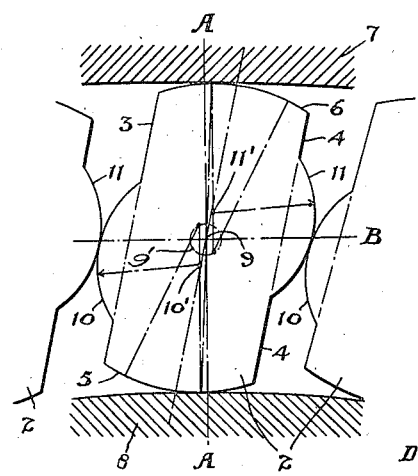

Free wheel clutches having clutch blocks with eccentrically arranged cylindrical surfaces engaging the cylindrical surfaces of the driving and driven members have been previously proposed but such have required the use of guides such as rollers of a lesser diameter than the radial distance between the cylindrical surfaces of the driving and driven members and carriages were required to support such guide rollers.

Such prior constructions are expensive to make and produce many undesirable conditions in the operation of the clutch.

In the present invention the side walls of the annular recess 1 in which the clutch blocks are housed are formed with parallel plane surfaces and preferably solid· with either one or the other of the rotatable cylindrical members.

The clutch blocks 2 are arranged within the anular recess 1 and are guided by the parallel plane surfaces thereof and are each formed of a single piece of hardened metal having parallel side faces 3 and 4 and eccentrically disposed cylindrical surfaces 5 and 6 to engage the respective cylindrical surfaces of the members 7 and 8. The axes of the surfaces 5 and 6 are offset either side of the radial line A cutting the symmetry axis 9 of the block 2 and are arranged on a common circle 9' encircling the axis 9 of the block.

Cylindrical surfaces 10 and 11 project from the parallel faces 3 and 4 of the block 2 and the axes 10' and 11' of these surfaces are arranged on opposite sides of the line A and on opposite sides of the perpendicular B cutting the axis 9.

The blocks thus formed when placed between the members 7 and 8 have their adjacent cylindrical surfaces 10 and 11 in surface contact thus a rolling contact is provided which maintains the outer surfaces 5 and 6 in true relation to the main cylindrical members 7 and 3 and friction is reduced to the minimum.

It is preferable that the rolling clutch blocks be held in positive contact around the cylindrical members and in Figure 2 I show an elastic expansion member 12 formed of two telescopic sections each having a spherical end 13 to engage the cylindrical surfaces 10 and 11 of the clutch blocks between which the expansion member is located. The telescopic members are held apart by the coiled compression spring 14.

Figures 5, 6:
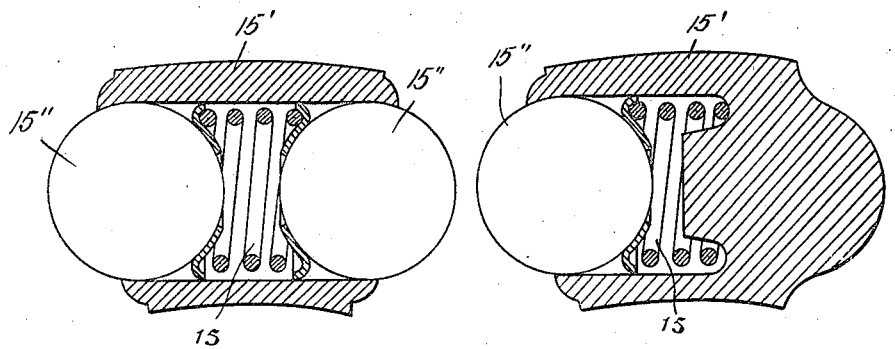
Figures 5 and 6 are enlarged longitudinal sectional views of modified constructions of elastic expansible members arranged between the clutch blocks.

Other forms of expansion members are illustrated in Figures 5 and 6, Figure 5 showing the compression spring 15 ' oused in a tubular member 15' having spherical bodies 15" which are forced apart by the spring 15 to engage the adjacent clutch blocks. Figure 6 shows the use of a single spherical body displaced outwardly by the spring 15, the opposite end of the casing having a spherical head to engage the blocks.

Figure 4:
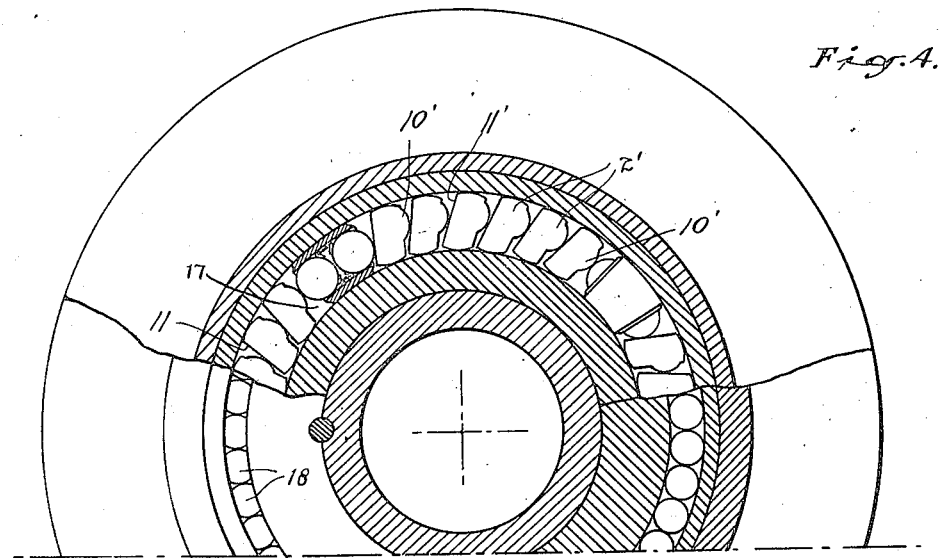
Figure 4 is a sectional elevation of a modified structure taken on the lines 4—4 and 4'—4' of Fig. 3.
Figure 3:
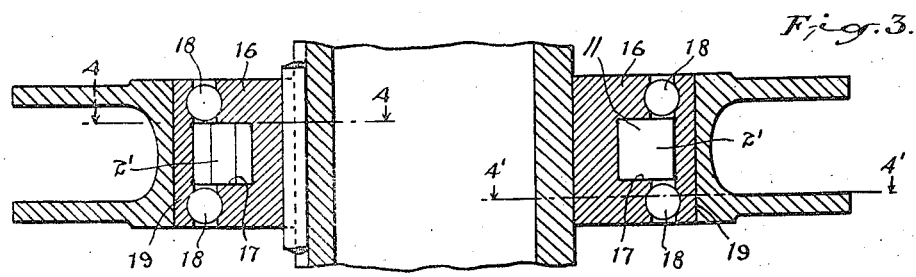
Figure 3 is a transverse mid-section through the modified construction illustrated in Figure 4.

In the form of the device illustrated in Figures 3 and 4 the inner cylindrical member 16 is U-shaped in cross section and the clutch blocks 2' are formed with cylindrical surfaces 10' on one side only which engage the plane surfaces 11' of the adjacent blocks, the blocks being placed in the annular groove 17 so that the ends of the blocks engage the parallel side walls.

Ball bearings 18 are arranged at both sides of the groove 17 to support the outer cylindrical member 19.

A free wheel such as described is very simple to construct and assemble, there will be no binding effect on the free running member other than that produced by a reverse movement which causes the clutch blocks to rock upon their axes to connect the two rotating members together.

What I claim as my invention is:—

1. A free wheel clutch comprising driving and driven members having spaced cylindrical surfaces, and clutch blocks having eccentric cylindrical surfaces to engage the aforesaid surfaces the axes of which are offset, said blocks also having cylindrical surfaces spaced a lesser distance apart than said eccentric surfaces and the axes of which are parallel with and spaced from the symmetry axis of each block, the latter surfaces forming rolling pressure contacts between the blocks.

2. A free wheel clutch comprising driving and driven members having spaced cylindrical surfaces, and clutch blocks having eccentric cylindrical surfaces to engage the aforesaid surfaces the axes of which are offset, said blocks also having cylindrical protuberances spaced a lesser distance apart than said eccentric surfaces and arranged on opposite sides, the axes of which are spaced apart in parallel offset relation to the axis about which the block revolves, said protuberances forming offset rolling contacts between the blocks.

3. A free wheel clutch comprising driving and driven members having spaced cylindrical surfaces, clutch blocks having eccentric cylindrical surfaces to engage the aforesaid surfaces and also having cylindrical surfaces the axes of which are parallel with the symmetry axes of the blocks, the latter surfaces forming rolling contacts for the blocks, and telescopic elastic expansion members interposed at intervals between the clutch blocks, said expansion members having spherical end surfaces.

4. A free wheel clutch comprising driving and driven members having spaced cylindrical surfaces and clutch blocks substantially rectangular in cross section having their narrow ends formed with eccentrically disposed cylindrical surfaces to engage said surfaces and having cylindrical protuberances extending from either side in oppositely offset relation to each other and forming pressure contact surfaces between the blocks, and resilient means for forcing said blocks into pressure contact.

5. A free wheel clutch comprising driving and driven members having spaced cylindrical surfaces and clutch blocks having oppositely arranged eccentrically disposed clutch surfaces to engage the former surfaces and having protuberances at the side each arranged adjacent the point of greatest eccentricity of one of said clutch surfaces and forming pressure engaging contacts between the blocks, and resilient means for forcing said blocks together into pressure contact.

6. A free wheel clutch comprising driving and driven members having spaced cylindrical surfaces and clutch blocks having oppositely arranged eccentrically disposed clutch surfaces to engage the former surfaces and having pressure contact protuberances at opposite sides each offset toward the point of greatest eccentricity of one of said clutch surfaces, and resilient means for forcing said blocks into pressure contact.

In testimony whereof I have signed my name to this specification.

DIMITRI SENSAUD DE LAVAUD.